US009358496B2

(12) United States Patent
Berges et al.

(10) Patent No.: US 9,358,496 B2
(45) Date of Patent: Jun. 7, 2016

(54) ADSORPTION BED STRUCTURE AND PROCESS

(71) Applicants: Pedro Berges, Buffalo, NY (US); Paul William Belanger, Clarence Center, NY (US); Timothy M. Aaron, East Amherst, NY (US)

(72) Inventors: Pedro Berges, Buffalo, NY (US); Paul William Belanger, Clarence Center, NY (US); Timothy M. Aaron, East Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 335 days.

(21) Appl. No.: 13/934,263

(22) Filed: Jul. 3, 2013

(65) Prior Publication Data
US 2015/0007723 A1   Jan. 8, 2015

(51) Int. Cl.
*B01D 53/02* (2006.01)
*B01D 53/047* (2006.01)
*B01D 53/04* (2006.01)

(52) U.S. Cl.
CPC .......... *B01D 53/047* (2013.01); *B01D 53/0407* (2013.01); *B01D 53/0446* (2013.01); *B01D 53/0462* (2013.01); *B01D 53/0476* (2013.01); *Y02C 10/08* (2013.01)

(58) Field of Classification Search
CPC combination set(s) only.
See application file for complete search history.

(56) References Cited

U.S. PATENT DOCUMENTS

| 2,080,578 | A | 5/1937 | Ray |
| 5,290,345 | A * | 3/1994 | Osendorf ........... B01D 53/0446 55/385.2 |
| 5,324,159 | A | 6/1994 | Nowobilski et al. |
| 8,268,043 | B2 | 9/2012 | Celik et al. |
| 8,361,205 | B2 | 1/2013 | Desai et al. |
| 8,388,745 | B1 | 3/2013 | Pelletier et al. |
| 2004/0159235 | A1 | 8/2004 | Marganski et al. |
| 2011/0146494 | A1* | 6/2011 | Desai ................. B01D 53/0415 96/115 |

FOREIGN PATENT DOCUMENTS

GB     606867     8/1948

OTHER PUBLICATIONS

Pushnov, A.S., "Calculation of Average Bed Porosity", Chemical & Petroleum Engineering. vol. 42, Nos. 1-2, pp. 14-17 (2006).
W.E. Gross, J.C. Goshorn, "An Instrument for Determining the Volume and Bulk Density of Granular Materials", *ASTM Bulletin*, pp. 55-59 (Mar. 1948).

* cited by examiner

*Primary Examiner* — Duane Smith
*Assistant Examiner* — Adam W Bergfelder
(74) *Attorney, Agent, or Firm* — Ralph J. Mancini

(57) ABSTRACT

An adsorbent bed structure and process is disclosed for use in an adsorption based gas separation process. A conventional adsorbent bed in a gas separation process is replaced with a one or more modular compact adsorbent bed units which are connected to make an adsorbent bed structure. The modular design requires lower fabrication and maintenance costs; is easier to transport; and is easier to load with adsorbent material.

7 Claims, 4 Drawing Sheets

ADSORPTION BED STRUCTURE AND PROCESS

FIELD OF THE INVENTION

The present invention relates generally to the field of adsorption bed structures used in gas separation processes. More particularly, this invention relates to adsorbent bed structures used in adsorption based gas separation processes comprised of individual modular compact adsorbent bed units.

BACKGROUND OF THE INVENTION

Gas separation processes using adsorbent beds are well known in the art. Typical adsorption based processes include those where at least one more adsorbable gas component is selectively adsorbed from a multi-component feed gas to produce a product gas containing one or more less adsorbable gas components. Of particular interest, but not limited thereto, are cyclic adsorption processes wherein at least one adsorbed gas component is removed from the adsorbent material using a reverse gas flow such as conducted in pressure swing adsorption (PSA) processes, vacuum swing adsorption (VSA) processes, vacuum pressure swing adsorption (VPSA) processes, or temperature swing (TSA) processes. These processes have evolved significantly over the last few years with improvements being made to the adsorbent materials, the adsorbent beds, and the overall process parameters and controls. Costs associated with the construction and operation of such plants are constantly being driven lower by competitive market pressures and it has become paramount to reduce the costs associated with designing, building, transporting and operating such plants by decreasing bed sizes and standardizing components. It is desirable to utilize smaller or compact bed structures for reducing the adsorbent material requirements; reducing the size of the plant equipment such as the process vessels and surge tanks; and also reducing the overall plant footprint including the transportation skid dimensions. Smaller skids in turn reduce transportation and installation costs.

The present adsorption bed structure brings together the benefits of a design utilizing; low inlet void volumes, large bed areas, and short bed depths (transfer lengths) in a modular and scalable adsorbent bed design requiring decreased adsorbent inventory and smaller plant equipment with smaller overall dimensions. These modular compact designs are more suitable for reduced transfer length geometry than conventional bed configurations since the larger vessels are hard to fabricate and have height and size limitations in such traditional configurations. This is particularly true for radial bed designs. Also, the capability of providing shorter cycle times now used with modern process intensification requirements are difficult to implement in the traditional larger configurations due to the high void losses and reduced valve life. For example, conventional radial or axial configurations would require several separate vessels which would make them uneconomical to construct and maintain.

It is therefore desirable to design new adsorbent bed systems for use in adsorption based gas separation processes that are generally smaller in size; require lower fabrication costs; are easier to transport; have less maintenance and repair requirements; and are easier to load with adsorbent material. It is equally important to design adsorbent beds that are smaller, but do not negatively affect the process flow; cycle speed; rate and volume of throughput; and potentially increase overall power requirements of the newer, more intensified processes. These smaller designs result in significant cost savings for an adsorption based gas separation plant.

Prior modular compact bed designs have been proposed. For example, U.S. Pat. Nos. 8,361,205 and 8,268,043 disclose two such designs. The present invention discloses a unique modular design which has advantages related to cost of manufacture and operation. In one aspect, the separate feed and product channels taught herein provide a more consistent flow distribution and less pressure drop resulting in a more balanced feed and product flow. Another aspect of the invention involves the fact that the assembly of the internal components makes the overall structure stronger and requires less overall materials of construction (normally carbon steel and often stainless steel) than previous designs. The external product manifold disclosed herein also enables the use of inexpensive welds or other techniques for sealing and makes it possible to use less expensive valves or other flow restricting devices or geometries to trim the gas flows into each modular compact adsorbent bed unit resulting in a more balanced process gas flow.

BRIEF SUMMARY OF THE INVENTION

The present invention provides a novel modular compact design for adsorbent bed vessels used in adsorption based gas separation processes and is particularly suitable for cyclic adsorption processes such as PSA, VSA, VPSA, and TSA processes. The modular compact design comprises individual modular (adsorbent) bed units which can be connected in an in-line sequence to form an integrated modular adsorbent bed referred to, herein, as a "modular bed structure" of varying size and length. The modular compact bed design facilitates increased bed frontal flow areas, shorter bed depths, and optimal transfer lengths.

One embodiment of the present invention includes an adsorption based gas separation process for removing at least one absorbable gas component from a feed gas containing at least one absorbable component comprising: passing feed gas into an adsorbent bed structure comprised of one or more connected modular compact adsorbent bed units, wherein each unit allows for feed gas ingress and product gas egress that is in flow communication with a flow channel within the units and comprises:
  a) two distal substantially parallel gas non-permeable outer walls consisting of a first outer wall and a second outer wall;
  b) two substantially parallel gas permeable inner walls positioned within the outer walls consisting of a first inner wall proximate to the first outer wall and a second inner wall proximate to the second outer wall;
  c) an external wall enclosing the peripheral edge of the inner and outer walls and forming a first compartment between the first outer wall and the first inner wall and a second compartment between the second outer wall and the second inner wall;
  d) a feed flow channel allowing feed gas to pass through the inner and outer walls and excluding gas from entering the first compartment;
  e) adsorbent material densely packed between the first and the second inner wall and around the outer perimeter of the flow channel; and
  f) an outlet channel allowing for removal of the product gas;
wherein the feed gas passes through the flow channel and is partially deflected by contact with the second outer wall causing at least some portion of deflected feed gas to reverse direction and flow through a second compartment in a countercurrent direction to the flow within the flow channel and pass through the adsorbent material in the adsorbent bed structure, and wherein the at least one adsorbable gas component of the feed gas is preferentially adsorbed by the adsorbent material resulting in a product gas containing one or more less adsorbable gas component(s) exiting the adsorbent material, passing through the first compartment into an outlet channel so that the product gas is collected in a product gas manifold that is preferably external to the external wall.

In another embodiment of the present invention a modular compact adsorbent bed unit comprising:

a) two distal substantially parallel non-permeable outer walls consisting of a first outer wall and a second outer wall;

b) two substantially parallel gas permeable inner walls positioned within the outer walls consisting of a first inner wall and a second inner wall;

c) a substantially circular external wall enclosing the peripheral edge of the inner and outer walls and forming a first compartment between the first outer wall and the first inner wall and also forming a second compartment between the second inner wall and the second outer wall, d) a feed flow channel that allows for passing feed gas through the outer and inner walls and excludes the feed gas from being in flow communication with the first compartment, the feed flow channel being capable of flow communication that allows flow into a second modular compact adsorbent bed unit;

e) adsorbent material packed between the first and said the second inner walls and around an outer perimeter of the flow channel to form an adsorbent bed;

f) and at least one outlet channel in the first compartment that allows removal of permeate gas from the adsorbent bed into a product gas manifold.

A modular compact adsorbent bed structure is also provided made from one or more of such units.

In yet another embodiment of this invention, an adsorbent bed structure is provided comprising:

a plurality of compact modular adsorbent bed units, each including:

two opposed ends;

an external wall extending between the two opposed ends;

an adsorber bed contained within and enclosed by the external wall;

a first compartment located between the adsorber bed and one of the two opposed ends;

a second compartment located between the adsorber bed and the other of the two opposed ends;

a feed flow channel for introducing a feed gas stream containing at least one adsorbable gas component into the adsorber bed;

the feed flow channel passing through the first compartment adjacent the one of the two opposed ends and in communication with the second compartment adjacent the other of the two opposed ends; and an outlet channel in communication with the first compartment;

the plurality of compact modular adsorbent bed units connected end to end such that, as between any two adjacent compact adsorbent bed units, the second compartment of one of the two adjacent compact adsorbent bed units is situated adjacent to the first compartment of the other of the two adjacent compact adsorbent bed units, and part of the feed gas stream flows from the second compartment and into the adsorber bed of the one of the two adjacent compact adsorbent beds, while another part of the feed gas stream flows into the feed flow channel of the other of the two adjacent compact adsorbent bed units to permit the at least one adsorbable gas component to be adsorbed in the adsorber bed in a direction taken counter current to a flow direction of the feed gas stream within the feed flow channel, thereby and producing a product gas stream containing one or more less adsorbable gas components in the first compartment of each of the compact modular adsorbent bed units; and a product gas manifold connected to the outlet channel of each of the compact modular adsorbent bed units to collect the product gas stream produced by each of the compact modular adsorbent bed units.

Finally, one or more modular compact adsorbent bed structures can be combined and configured in parallel flow arrangement (as exemplified in FIG. 5) to achieve a more efficient use of the newer high rate adsorbents and to obtain reduced pressure drops through the system.

BRIEF DESCRIPTION OF THE DRAWINGS

For a more complete understanding of the present invention, reference should be made to the following Detailed Description taken in conjunction with the accompanying Figures in which:

FIG. 3b is an exploded view version of the unit shown in FIG. 3a.

DETAILED DESCRIPTION OF THE INVENTION

Figure 1:
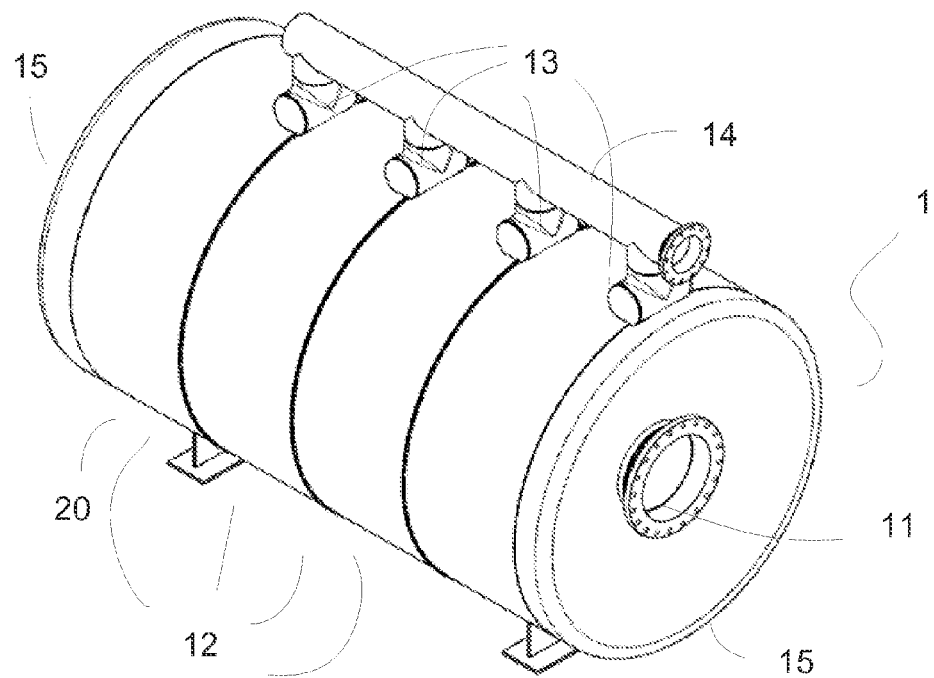
FIG. 1 is an exterior perspective view of one embodiment of this invention showing an adsorbent bed structure having four modular compact adsorbent bed units with a generally circular design and connected in an in-line sequence.

The present invention is directed to a modular adsorbent bed structure made by the connection of a plurality of modular compact adsorbent bed units providing for a process employing these units resulting in optimal gas separation. The term "modular adsorbent bed units" or "units" as described herein are the individual units containing an adsorber bed containing adsorbent material and each unit can be connected to additional units to form a "modular adsorbent bed structure".

Accordingly, one or more conventional packed beds used in a gas separation plant are replaced with a plurality of modular compact adsorbent bed units which combined together comprise the complete adsorption vessel described herein as an adsorbent bed structure. Each of the individual modular compact adsorbent bed units contain adsorbent material and are combined to construct a fully sized adsorbent bed structure having the size and dimensions required for the particular process requirements. These units can be shop packed (adsorbent packed within the controlled environment at the manufacturing shop) for uniformity and quality and can be shipped, offloaded, and connected to the rest of the plant in the field with minimum effort and shut down times. Such modular units also provide additional savings and design flexibility due the reduced size and amount of adsorbent material required.

The modular compact configuration of this invention also provides a higher capacity of product per unit volume of adsorbent material (i.e., increased adsorbent utilization) when compared to that obtained from a conventional packed bed. This invention provides for substantial reduction of the pressure drop in the adsorbent bed structure by providing a very large flow area (frontal area) combined with shorter bed depths, thus optionally facilitating faster cycles when used in preferred cyclic processes. The present invention differs from conventional single bed radial or axial geometry configurations.

For the purposes of the present invention, the term "modular" means reconfiguring a given frontal flow area of a conventional adsorbent bed into (normally) several smaller more manageable sections that fit together, are easier to load adsorbent material into, are easier to handle, and generally provide greater flexibility in design and operation of the overall adsorption bed structure. The term "compact" refers to the geometry and design of the individual units which can provide intensification of the process by decreasing the adsorbent volume required for a given feed flow (by decreasing the bed depth) when, for example, cycling the process at a faster rate. The term "frontal area" as used herein is the surface flow area across one of the gas permeable inner walls containing the adsorber bed within the modular units. The term "bed depth" refers to the depth of the bed containing adsorbent material in the bed as measured along the direction of gas flow across the bed. Bed depth is also sometimes referred to as bed transfer length. To ensure that there is an option to implement faster adsorption/desorption cycles, the specific geometry of the bed is important. The desired geometry of the bed is one for which the adsorbent volume is decreased in proportion to the flow rate, so that an optimal flow rate can be obtained thereby ensuring proper intensification. For the present invention, using beds with relatively small transfer lengths and large frontal areas, intensification can be maintained. In the modular bed configuration, proper intensification and capacity can be achieved by adjusting the number of modules and the quantity of adsorbent in each modular unit.

The adsorbent bed structures disclosed here are used in adsorption processes. Adsorption processes are well known and have been widely used for the separation or purification of gases. This invention is particularly suitable for a cyclic adsorption process, preferably PSA, VSA, VPSA, and TSA processes, which are also known. In a cyclic process, a multi-component feed gas, such as air, is introduced to the adsorbent bed structure; an absorbable component of the multi-component feed gas, such as nitrogen, is preferentially adsorbed by the adsorbent material in the bed; and a component depleted product gas, such as oxygen, is recovered (as a product gas). In the reverse cycle, the gas flow is reversed to remove or desorb the adsorbed gas component from the adsorbent material in the bed. This may lead to a second product gas or the gas may simply be vented or discharged. Desorption is typically carried out in conjunction with a reduction in pressure and/or an increase in temperature that reduces the capacity of the adsorbent material to store the adsorbed component. The adsorption/desorption cycle is then repeated.

Although the present invention will be described herein as being used in a PSA, VSA, VPSA or TSA cyclic process, this invention is applicable to any fixed bed adsorption based gas separation process using a densely packed adsorbent material to separate, remove, react or purify gas components and is not limited to cyclic processes. Examples of suitable processes include oxygen VPSA systems; hydrogen PSA systems; PSA and TSA air purification systems; CO2 VPSA systems; nitrogen PSA systems; and ethanol dehydration systems. Other adsorbent based gas separations processes can include processes for the separation of gases such as hydrogen, argon and carbon dioxide and for the removal of water. Cyclic processes are preferred, particularly intensified cyclic processes (as described below) and most preferred are air separation processes wherein the oxygen and nitrogen components of air are separated.

A wide range of adsorbent materials can be used depending on the process employed. The adsorbent material is typically granular and can be provided in any physical form such as cylindrical pellets, spherical beads, crushed granules, or any agglomerate of the types commonly used in adsorption processes. Adsorbent materials include synthetic or natural zeolite molecular sieves, activated carbon, activated alumina, silica gel, etc., and can be mixed with reactive or catalytic components in certain processes. Preferably, the adsorbent materials will be porous particulate materials such as molecular sieves.

The adsorbent material can be composed of a single layer of material or of two or more layers of one or more materials. For example, the first material nearest the feed inlet can be one selected to remove water while the second material serves as the selective gas adsorbent material. There may also be an increased number of layers, e.g., three or four, packed within the modular adsorbent bed unit, depending on the desired adsorption application and process design with optional separation techniques including metal, plastic or fiber screens or woven materials between the layers/materials. In air separation applications, the first layer of material typically removes carbon dioxide and/or trace hydrocarbons in addition to removing water while the second adsorbs nitrogen. The adsorbent material may be packed particles or in other arrangements such as in the form of a monolithic or honeycomb structure. The adsorbent material can also be coated onto thin plates in the form of honeycomb cellular structures with enough open area to allow sufficient gas molecules to flow through the structure. For PSA and VPSA air separation processes, the gas adsorbent material is typically one or more zeolite molecular sieves which can incorporate metal ions such as Lithium ions.

The cycle time required for a "conventional" cyclic adsorption process depends upon the specific separation process and adsorbent material. For example, conventional two-bed adsorption air separation processes using $N_2$-selective zeolites producing 90 percent or greater $O_2$ purity product typically have a bed depth of 1.0 m or greater and operate with a total cycle time greater than 30 seconds (s). An intensified air separation process is one with a cycle time (adsorb/desorb) that is generally less than 30 seconds and has a reduced bed depth.

Each modular compact adsorbent bed unit has an adsorber bed having a short depth and a large frontal area to promote adsorption/desorption. This bed design geometry, referred to as a compact or shallow bed, allows for a shorter adsorption cycle to obtain maximum adsorbent utilization. Such bed design geometries are more fully discussed in U.S. Pat. Nos. 8,361,205 B2 and 8,268,043 B2 which are hereby incorporated by reference.

The compact bed design intensifies the adsorption/desorption process during the preferred cyclic process resulting in increased adsorbent utilization (increased product per unit volume of adsorbent material) and reduced pressure drop across the adsorbent bed as compared to that obtained from a conventional packed bed. It is also important to achieve even gas flow distribution in compact beds to avoid mal-distribution of process gas flow by controlling all flow channel designs and by minimizing inlet void volume space, i.e. void space on the inlet side of the modular adsorbent bed unit. Good flow distribution across the inlet face of the modular adsorbent bed unit is achieved when the velocity and distribution is uniform. Such a condition is influenced by the size and geometry of the structure including the inlet space, the inlet void volume, the pressure drop across the bed, and other void flow spaces.

Flow distribution can be predicted using computational fluid dynamics (CFD) techniques as are commonly known in the art and the detailed design of the current units can achieve optimal flow distribution as described herein.

Figure 2:
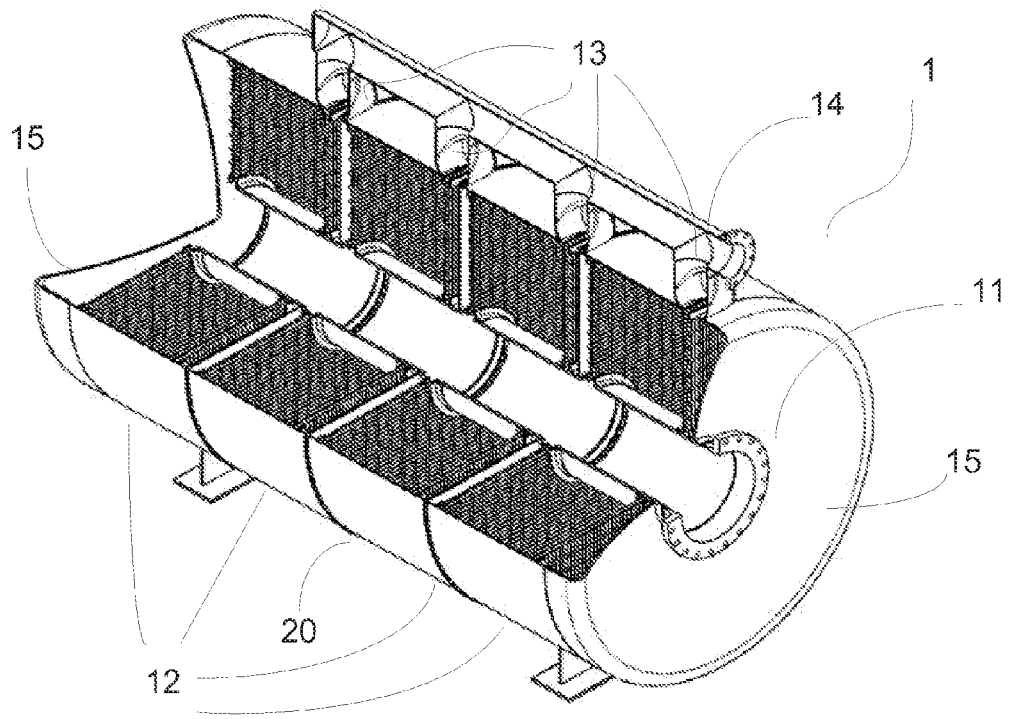
FIG. 2 is the adsorbent bed structure shown in FIG. 1 with a 90 degree cut-away perspective showing an internal view of the structure.

FIGS. 1 and 2 show one embodiment of this invention comprising an adsorption modular bed structure (1) having a generally circular design and four modular compact adsorbent bed units connected in sequence. The circular design provides for an even distribution of stress on the walls of the structure and is preferred. As shown, the modular compact adsorbent bed units (12) are connected normally in sequence to comprise the fully sized adsorbent bed structure (1) and provide a parallel process gas flow configuration through the modular adsorbent bed units (12). This corresponds conceptually to a parallel electrical current flow through resistors in parallel, where the current corresponds to the process gas flow and the resistors correspond to the modular adsorbent bed units (12). Welds or other techniques can be used to connect the units (12). The connection means serve to maintain connection during operation and to limit, or preferably eliminate, process gas leaks from the structure. The modular bed structure (1) can be connected to the plant with conventional fasteners such as nuts and bolts.

Each complete adsorbent modular bed structure (1) is generally designed and built to be fully (and individually) resistant to pressure and vacuum forces and able to withstand the pressure variation of the adsorption process, particularly for pressure swing cyclic processes. The complete adsorbent bed structure is comprised of one or more modular adsorbent bed units (12) and end caps (15). The units are designed to be connected in sequence with a plurality of units operating in association, although it is possible for a single unit to be employed, provided it has end caps (15) capable of sustaining the pressure cycle. The modular compact adsorbent bed units (12) are not restricted to the substantially circular or cylindrical geometry as shown and can be of varying shapes including, but not limited to, oval, ellipsoidal, and conical shapes.

Figure 5:
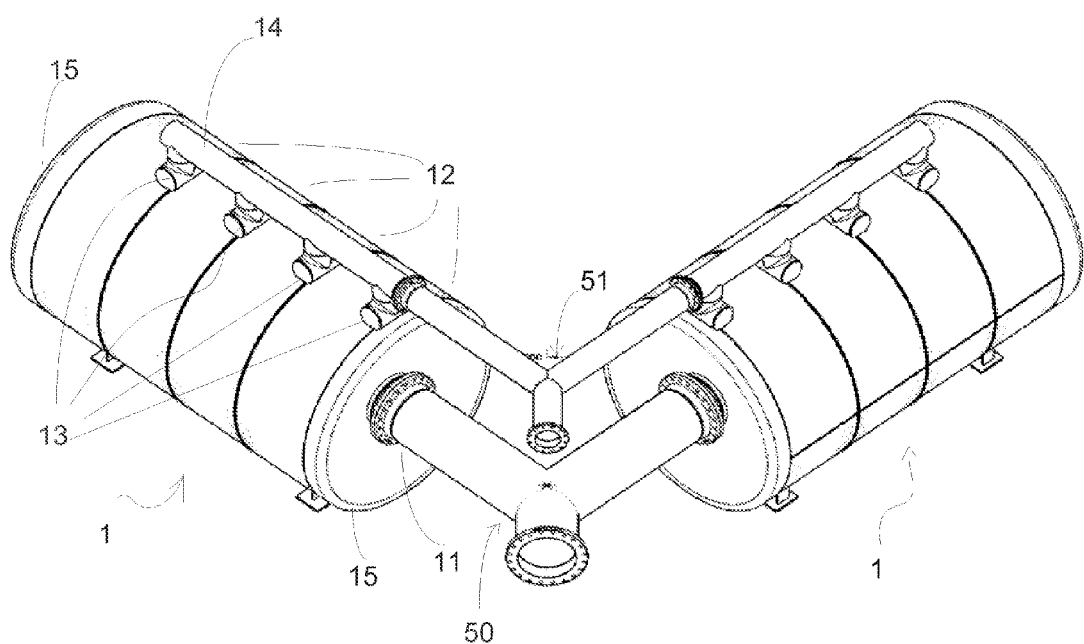
FIG. 5 is an illustration of a gas separation plant comprising two modular adsorbent bed structures.

Referring to the embodiment shown in FIGS. 1, 2, 3a, and 3b, the adsorbent bed structure (1) has four generally circular modular adsorbent bed units (12) with an axial feed flow channel (11) and a outlet channel (13) to remove product gas that subsequently flows into a common product gas manifold (14). Normally, two to ten modular units are used in the preferred configuration of this invention capable of producing 15-70 tonnes per day of product gas with three to six units being most preferred for cyclic processes capable of producing 20-40 tonnes per day of product gas. Each adsorbent bed unit (12) is placed in a sequential order resulting in a parallel flow configuration to permit the continuous flow of process gas to each unit with substantially identical flow distributions. Multiple structures (with multiple modular units) can also be used together as shown in FIG. 5.

Figure 3A:
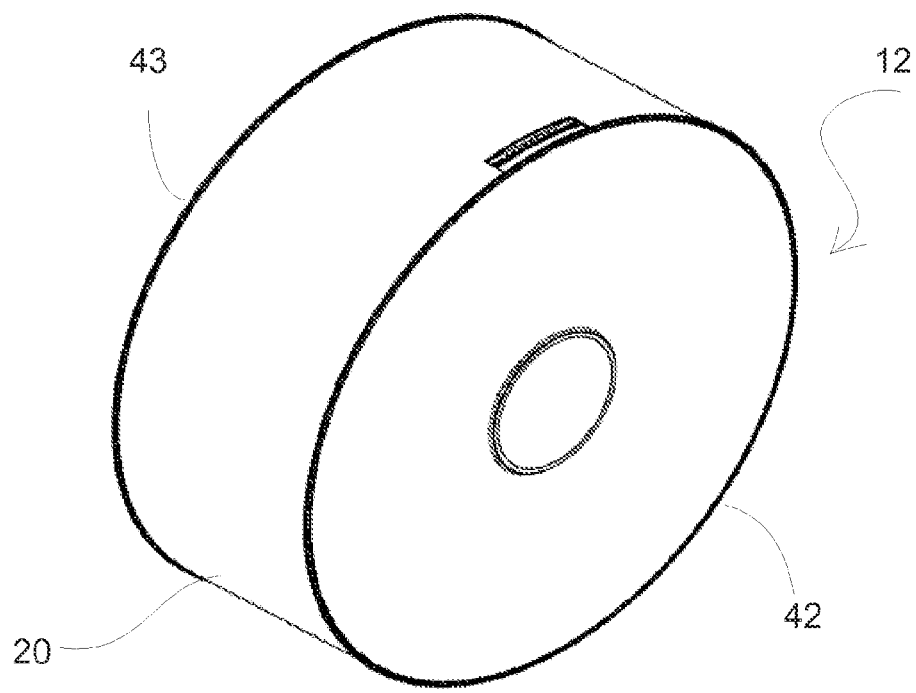
FIG. 3a is a perspective view of a distal single modular adsorbent bed unit which is a portion of the embodiment of FIG. 1.
Figure 3B:
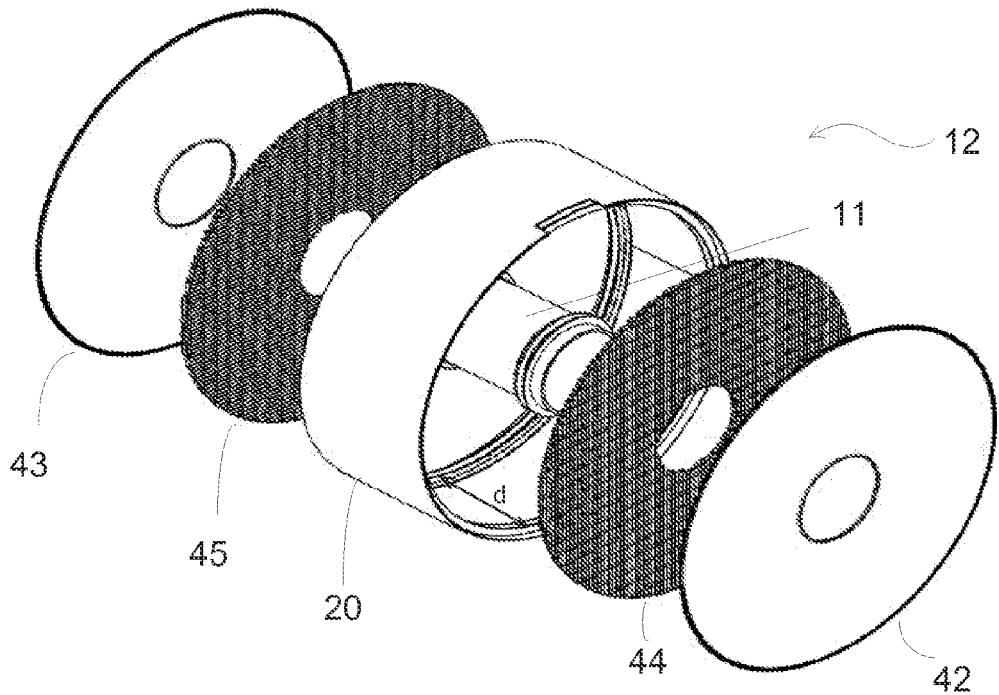

As best shown in FIGS. 3a and 3b, each unit (12) is comprised of two distal, substantially circular and parallel non-permeable outer walls (42, 43) with the first outer wall (42) proximate to the inward flow of the feed gas and second outer wall (43) at a distal position to first outer wall (42). The outer walls can be provided with a dished-shaped geometry for added strength as well as allow for an increased outlet channel flow area or using a flat geometry for lower fabrication cost. In practice, the second outer wall (43) may comprise the first outer wall of the second or consecutive modular compact adsorbent unit(s) when connected in sequence. As one skilled in the art would recognize, the first outer wall of the first modular unit and the second outer wall of the last modular unit must be robust with geometries designed to handle the full process gauge pressure. In FIGS. 1 and 2 the caps are shown as flanged and having reversed dished heads, but other types of caps can also be used. Two substantially circular and parallel gas permeable inner walls (44, 45) are positioned within the outer walls (42 and 43) consisting of first inner wall (44) proximate to first outer wall (42) and second inner wall (45) proximate to second outer wall (43) as shown. External wall (20) is connected to and surrounds the peripheral edges of the inner walls and outer walls. A first compartment (not numbered) is formed between the first outer wall (42) and the first inner wall (44) and a second compartment (also not numbered) is formed between the second inner wall (45) and the second outer wall (43) to provide a cross sectional area and corresponding volume for proper gas flow.

Adsorbent material (not shown) is densely packed and retained within the volume of space that is contained between the two inner walls (44 and 45) and the external wall (20) forming the absorber bed. Feed flow channel (11) is positioned at a common location in each consecutive modular unit in a location to promote continuous flow of feed gas through each of the units but the flow is not continuous between the second inner wall (45) and the second outer wall (43). The flow of feed gas is in fluid flow communication with the feed gas channel or second compartment of each unit along the length of the feed manifold. The feed manifold also allows the exit of waste gas when the flow is reversed (for example in the desorption process). In an alternative embodiment, the feed flow channel is continuous through the second modular unit which can include orifices, baffles or other flow distribution techniques to permit the feed gas to partially exit the feed flow channel at the second modular unit prior to exiting the unit.

Outer walls (42 and 43) as shown in FIGS. 3a and 3b are illustrated as components of a modular unit located within the complete adsorbent bed structure and not at either distal end of the combined structure. Each distal end of the complete adsorbent bed structure generally consists of the first and second outer walls of two different units and will typically have end caps used in addition to, or in place of, each distal outer wall of the combined structure (vessel). For example, end cap (15) is shown in FIGS. 1 and 2 and a corresponding end cap would be used in at the distal end of the forth unit. The units can be connected by conventional welds or other fastening techniques including but not limited to gaskets, bolts, couplings, O-rings, etc. to ensure pressure tight connections. Feed flow channel (11), typically a pipe or other conduit for gas flow, is positioned at the approximate center of the inner walls (44, 45), the first and second outer walls (42 and 43), and the adsorber bed to permit the flow of feed gas into the unit and through the bed via feed flow channel (11) but not contacting the adsorber bed. The precise location of the feed flow channel can be modified as desired. Feed flow channel (11) passes through first outer wall (42), first inner wall (44) and second inner wall (45) and stops prior to contacting the second outer wall (43), thus permitting the partial continuation of feed gas flow into the corresponding feed channel or second compartment. This allows for partial contact with the second outer wall (43), which now operates as a baffle, so that the product gas is partially distributed back to flow into structural unit (12). In operation, the partially distributed feed gas flows back into structural unit (12) in a reverse flow direction through the second compartment and also through the adsorber bed. More specifically, the least one adsorbable gas component in the feed gas is adsorbed in the adsorber bed in a direction reverse or counter current to the flow direction of the feed gas stream within the feed flow channel (11). As previously explained, the adsorbent (not shown) is packed around the periphery of the feed flow channel (11). The component depleted feed gas (permeate gas) now exits the adsorbent bed as product gas and proceeds to the first compartment where it contacts the first outer wall (42) and flows into the outlet channel (13). The product gas is collected by a common product gas manifold (14). A corresponding feed flow channel of the next modular unit is position adjacent to the feed flow channel (11) to partially receive the feed gas as it passes through each connected additional modular compact adsorbent bed unit. The corresponding feed flow channel for the adjacent unit is typically of the same size and dimension as feed flow channel (11), but can be modified in size or shape to permit more or less gas flow into the next modular unit, as desired. Gas flow baffles, guide vanes, screens, or restrictors can be employed (not shown) as may needed to aid in distribution of the feed gas through consecutive modular adsorbent beds.

The inner walls (44, 45) are gas permeable and are typically constructed of perforated metal plates, grating, wire mesh and/or cloth screens, although other permeable means for retaining the adsorbent material and permitting gas flow can be employed. External wall (20) is non-permeable and encloses the unit. No process gas flows into or from the modular adsorbent bed unit through the external wall (20) allowing for the external wall to hermetically seal the unit so that process gas flow is directed into the desired flow paths.

The product gas manifold (14) is located on the periphery, external to the external wall (20) and is connected to each outlet channel (13) located in the first compartment between the first outer wall (42) and the first inner wall (44) of each unit. Each outlet channel is attached to the product gas manifold (14) in such a way so that the flow area is maximized thereby reducing the pressure drop. This can be accomplished by, for example, using machined T-like connections or other similar arrangements. Each individual connection to the product gas manifold (14) can include the use of valves or other flow restricting devices to trim the flow of gas into each unit. The product gas manifold (14) is designed to accept permeate or product gas as it exits the outlet channel from each modular compact adsorbent bed unit. The product gas manifold is typically a pipe machined to accept the connections to each module. The distal units of the adsorbent bed structure may be modified to support the ingress and egress of process gas into and from the structure including end caps that hermetically seal and provide mechanical strength to the unit and may also be used as outer walls for the distal unit. In addition, further legs or other supports can be used to keep the adsorbent bed structures (1) off the ground or at the desired position. FIGS. 1 and 2, exemplify support structures that one skilled in the art would recognize are typically used for horizontal vessels. However, any type, shape, or kind of support structure may be used.

The feed flow channel (11) and product manifold (14) will be connected to the necessary piping and valves in the adsorption plant so that the feed, product, and reflux process gas flows (not shown) allow for operation of the structure (1) in a conventional adsorption process. For manufacturing, welding, and assembly operations, the modular units are simpler to create than larger radial and axial vessels. Each unit is more easily accessible than a larger radial or axial vessel due to the smaller dimensions. Moreover the number of unique parts is significantly reduced over the radial and axial vessels, which lends to time savings in assembly. Also each unit has the same components, which lends itself to manufacturing savings due to reduced machine setup time and repeatability. The relatively smaller dimensions also allow for pre or "shop" loading of the adsorbent prior to installation. Moreover it is possible to make single adsorbent bed structures that are less than eight feet six inches (8.5) foot wide, making it a "legal" shipping load in most countries. In operation, feed gas from feed flow channel (11) flows through the center of the first outer wall (42) and through the center of inner walls (44, 45) without contacting the adsorbent material. The process gas continues through the feed flow channel (11) to the second external wall (43) where the feed gas is partially distributed along the adjacent feed flow channel of the connected unit in a continuous flow and is partially distributed back into the bed of the unit by reverse flow through the inner walls (45 and 44, respectively). This operation effectively connects the units in a normally parallel flow arrangement to provide a continuous flow of process gas into the adsorbent bed structure. During the process flow, some of the feed gas contacts the second external wall (43) at the periphery of the feed flow channel (11) and is redirected, in a reverse flow manner, through inner walls (44 and 45) and through the bed containing the adsorbent material. The permeate or product gas continues to flow until it contacts the first outer wall (42) where the gas is redirected to the product manifold (14) and collected. The feed gas flow is divided into each modular compact adsorbent unit and the product gas is collected by the connected product gas manifold (14).

In FIG. 2, the compact modular bed units (12) are designed to provide a single adsorbent bed structure (1) with sufficiently sized inlet/outlet process gas flow channels/manifolds to supply adequate process gas flow, but with minimum void volume ratios. High void volume ratios in cyclic systems reduce the efficiency of the process. The "void volume ratio" is defined here as the ratio of the feed side or inlet void volume (e.g. feed channel) to adsorbent volume, which includes the inter-particle space within the adsorbent material. The void volume ratio is a measure of inefficiency of the system because the inlet void volume is filled with pressurized gas during feed step and later this gas is discarded during desorption, thus creating a penalty to power. The adverse effect of inlet void volume on the process increases with shorter cycle times and shallower beds. High void volume ratios also adversely affect process performance by reducing recovery and production capacity and increasing power consumption. The faster the cycle, the more adverse the impact of the void volume ratio is on the process performance. Thus, in intensified processes, the void volume ratio becomes an important factor and small void volume ratios of less than 30% are preferred in the adsorbent bed structures as are taught in U.S. Pat. No. 8,361,205 B2.

Figure 4:
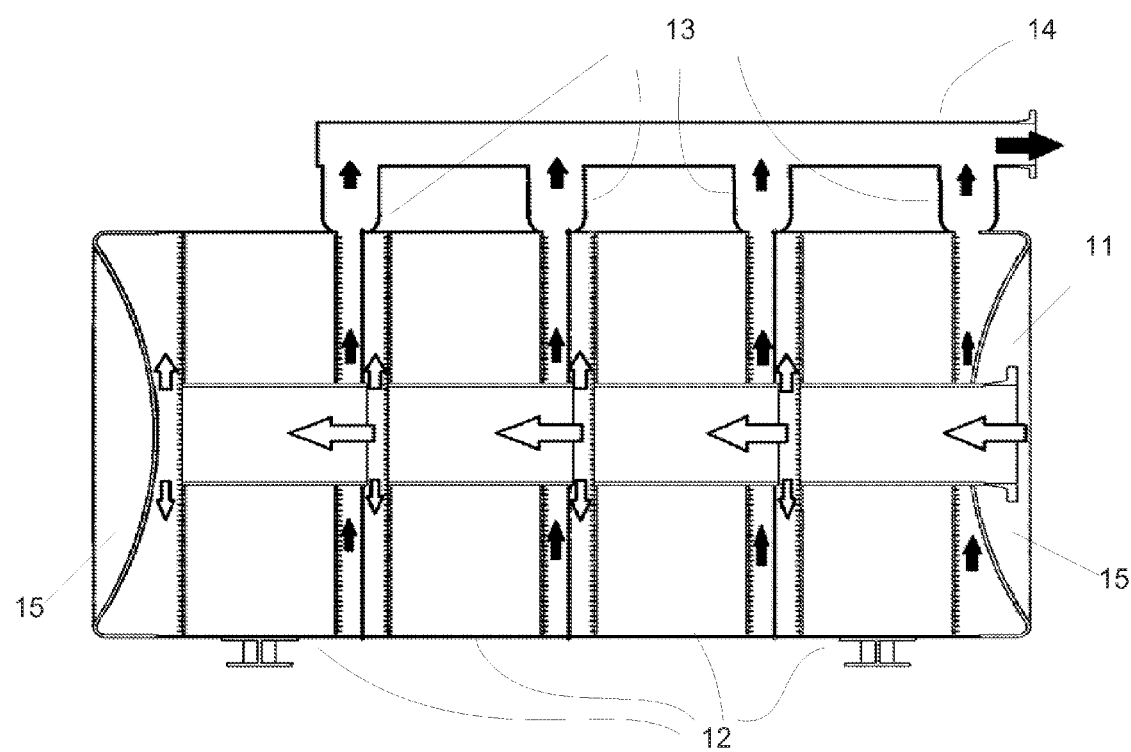
FIG. 4 is an illustration of the adsorbent bed structure of FIG. 1 showing the gas flow distribution during the adsorption process which is one phase of the cyclic adsorption process.

The flow of the process gas is best shown in FIG. 4. The process gas flow path is subject to, and determined by, the selected pressure drop across the bed which is partially dependent upon the depth (transfer length) of the bed. The transfer length is selected to equalize flow distribution through the adsorber bed.

In the cyclic process, the directions of all gas flows are reversed for initiation of the desorption step. During the adsorption step, gas remaining in the void spaces of the vessel as well as gas adsorbed within the adsorbent material is removed in a direction counter current (opposite) to the direction of the flow of the feed gas. During desorption (reverse flow through the entire unit) the feed flow channel (11) is utilized as an outlet channel for the desorbed gases and the product manifold becomes utilized as an inlet manifold. The desorption step may be carried out at a pressure above or below atmospheric pressure, at ambient or elevated temperature and with or without a positive purge gas.

The present invention includes the concept of providing an adsorber bed having a large frontal area and a short bed depth (shallow bed) to enhance the efficiency of the adsorption process. Referring again to FIGS. 3a and 3b, the largest dimension of modular adsorbent bed unit (12) is the diameter of inner walls (34 and 35) and the smallest dimension is the bed depth, shown as arrow (d). Based on a eight (8) foot bed, the diameter of one of the inner walls (34, 35) to the depth of the adsorbent bed (transfer length) shown as (d) is preferably in a range of between 10 and 2 and more preferably between 7 and 3. Preferred bed depths for cyclic adsorption processes are from 10 to 50 inches (25.4 to 127 cm) and most preferred are about 15 to 40 inches (28.1 to 101.6). Further, the distance between the first inner wall (34) and the first outer wall (32) and between the second inner wall (45) and the second outer wall (43) is one half of the adsorber bed depth or less. To take advantage of the modular design with a compact adsorber bed, the beds must be densely packed and the modular adsorbent bed units of the present invention will, preferably, have adsorbent material which has been densely packed. Bed voidage as used here is understood in the art and more fully described in U.S. Pat. No. 5,324,159. As described in GB Pat. No. 606,867 and by W. E Gross et al., dense uniform packing of the adsorbent can be achieved using a gravity-assisted filling method, in which adsorbents are dropped from a certain height in perpendicular direction to the bed depth, passed through the series of wire screens, and filled into the enclosed bed volume (W. E. Gross, J. C. Goshorn, "An Instrument for Determining the Volume and Bulk Density of Granular Materials", *ASTM Bulletin*, pp. 55-59 (March 1948)). With this method it is possible to achieve a dense packing of adsorbent particles in the bed with an inter-particle void fraction of less than 40% and most preferably 37% or less. Densely packed adsorbent material is confined within the modular adsorbent bed unit (12) between inner walls (34 and 35) and exterior wall (20) forming the bed.

As discussed, the adsorbent material is densely packed and retained within the bed. Varying structural containment methods or packing constraints can be employed as the inner walls (34, 35) or in addition to the inner walls, providing the containment means used to retain the absorbent materials in proper position and allow the process gases to flow through the adsorbent material without fluidizing the material under normal conditions of use.

FIG. 5 provides a perspective view of a gas separation plant with two modular compact bed structures having four units and connected in a modified configuration. This embodiment provides a process gas flow stream that is divided among the two modular beds using a fabricated "Y" pipe (50) for the feed flow to the feed flow channel (11) and a "Y" pipe (51) for the product flow from the product gas manifold (14). Other techniques and configurations can be employed to divide or control the process gas flow.

As described above, one advantage of using the adsorbent bed structure of this invention is the ability to intensify the process. This is particularly important with cyclic adsorption processes such as $O_2$ PSA and VPSA processes. For example, conventional $O_2$ VPSA process intensification efforts are geared towards shorter beds with faster cycles to reduce adsorbent inventory and capital cost. However, such an approach could result in a corresponding reduction in product gas recovery. This reduction in product gas recovery can sometimes be countered by using high rate adsorbents, e.g. adsorbents having a greater ability selectively adsorb and desorb target gas species.

Under certain operating conditions, processes with shallower bed depths can exhibit higher product gas recovery and will have a lower bed pressure drop across the bed than conventional processes. The reduction in pressure drop can lead to higher recovery and lower power requirements due to improved bed regeneration. For example, at the same bottom bed pressure ratio and same feed gas velocity, the top of the shorter bed will have a higher pressure during feed and a lower pressure during evacuation. This leads to a higher pressure ratio at the top of the bed and a higher overall average bed pressure ratio for a given top pressure. This results in greater bed regeneration. Consequently, the presently described process is particularly suited for use with modular compact adsorbent beds using short bed transfer lengths, more equalized flows, and an increase in the cycle time. This ultimately results in higher product recovery, greater capacity, and lower power requirements. In principle, the shorter transfer length can be implemented in a radial bed adsorber as well, but the cost of manufacture and implementation of this type of vessel is much higher. Flow distribution in the annular channels of the radial bed and the inspection of the mechanical integrity of the narrow annulus in the radial bed with adsorbent, is also very difficult. The modular bed concept overcomes these disadvantages and allows the shorter transfer length concept to be implemented.

A proper reduction in pressure drop may also be achieved by increasing the particle size of the adsorbent, which impacts the adsorbent's material mass transfer coefficient. The accompanying reduction in mass transfer coefficient will likely negate any benefit from a lower pressure drop. Another method of lowering the pressure drop is to lower the feed flow rate, i.e. the velocity of process gas through the bed that results in higher bed size factor and adsorbent inventory.

However, if it is desirable to maintain a longer cycle of 30 seconds or higher, this modular technique might be the preferred approach to design the process. The modular geometry is particularly suited in this case to take advantage of the shorter transfer length with higher frontal area. The frontal area can easily be increased by increasing the number of modules being used. Increasing the frontal area in a conventional radial bed geometry is often not possible, as the height of the radial bed is limited by flow distribution. Thus, shorter beds with high adsorbent rate materials may be utilized for both unit capital and unit power reduction.

The present invention includes adsorbent beds structures that can be employed in various adsorption processes including simultaneous adsorption cycles (single-feed), or cycles that are out of phase (multi-feed). A plurality of modular compact adsorbent bed units can be used with one or multiple adsorbent bed structures in processes such as single-bed, two-bed, three-bed, or multi-bed process modes. The capacity of the adsorbent bed structure can be varied through the adjustment of any or all of the modular compact adsorbent bed unit's height and width and the number of units installed within the structure.

It should be apparent to those skilled in the art that the subject provided is merely to demonstrate the operability of the present invention. The scope of this invention includes equivalent embodiments, modifications, and variations that fall within the scope of the attached claims.

What is claimed is:

1. A modular compact adsorbent bed unit comprising:
   a) two distal substantially parallel non-permeable and circular outer walls consisting of a first outer wall and a second outer wall;
   b) two substantially parallel gas permeable and circular inner walls positioned within the outer walls consisting of a first inner wall and a second inner wall;
   c) a circular external wall enclosing the peripheral edge of the inner and outer walls and forming a first compartment between the first outer wall and the first inner wall and also forming a second compartment between the second inner wall and the second outer wall,
   d) a feed flow channel positioned at the approximate center of the inner and outer walls that allows for passing feed gas through the outer and inner walls and excludes the feed gas from being in flow communication with the first compartment, the feed flow channel being capable of flow communication that allows flow into a second modular compact adsorbent bed unit;
   e) adsorbent material packed between the first and said the second inner walls and around an outer perimeter of the flow channel to form an adsorber bed;
   f) and at least one outlet channel in communication with the first compartment that allows removal of permeate gas from the adsorber bed into a product gas manifold.

2. The adsorbent bed unit of claim 1, wherein the product gas manifold is external to the external wall.

3. The adsorbent bed unit of claim 2, wherein the adsorber bed has an inter-particle void fraction of less than 40%.

4. The adsorbent bed unit of claim 1, wherein the outlet channel is located proximate to the non-permeable outer wall.

5. The adsorbent bed unit of claim 1, wherein the static volume of all outlet channels in the modular bed assembly is less than 90 percent of the volume of the feed flow channel.

6. The adsorbent bed unit of claim 1 wherein the ratio of the diameter of one inner wall to the depth of the adsorbent bed is in a range of between 2 and 10.

7. An adsorbent bed structure comprised of one or more modular compact adsorbent bed units as described in claim 1.

* * * * *